May 2, 1967
E. F. BRUNING
3,317,220
RELEASABLE FLUID COUPLING
Filed April 15, 1963
2 Sheets-Sheet 1
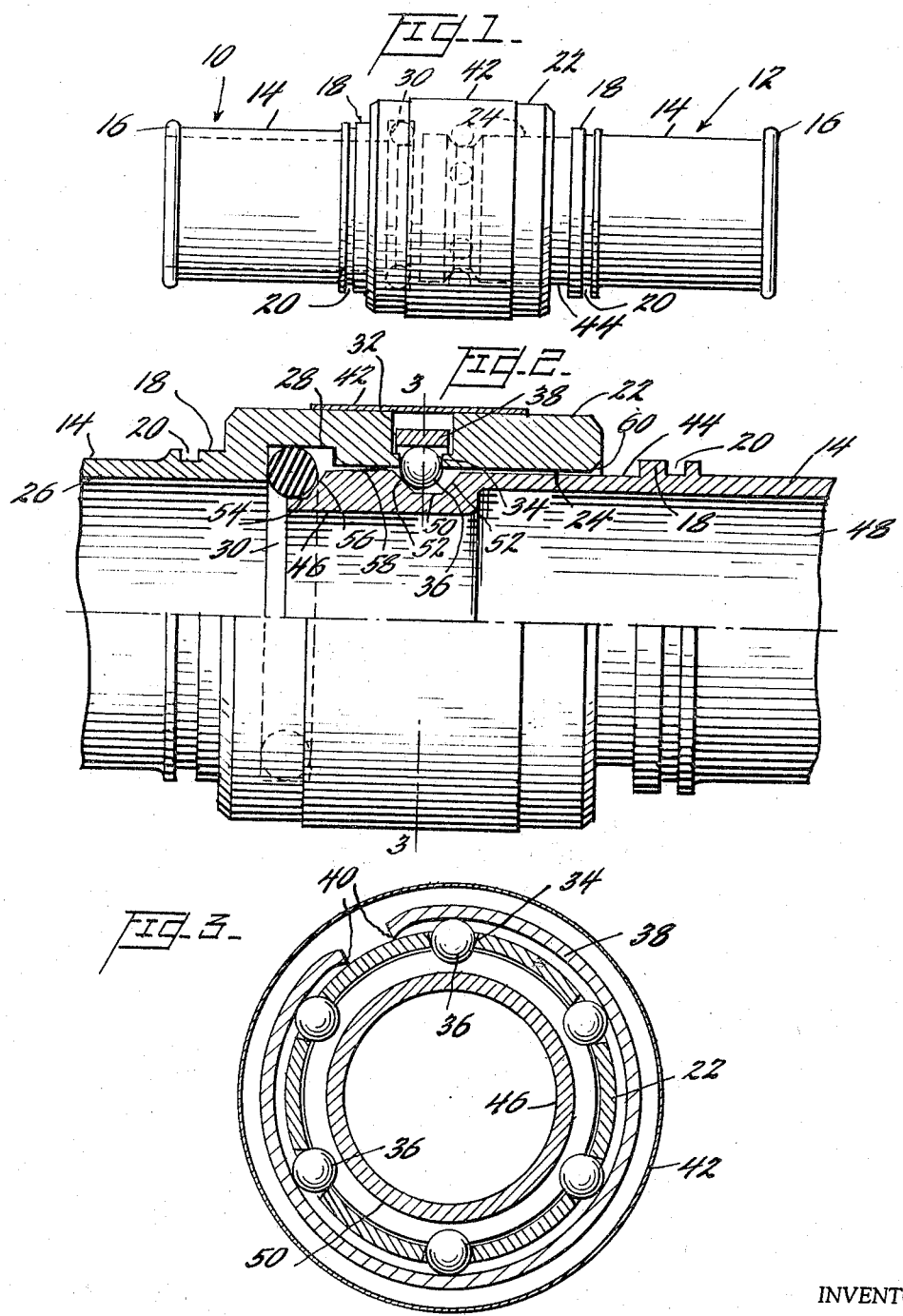
INVENTOR
*Earl F. Bruning,*
BY *Parker and Walsh*
ATTORNEYS May 2, 1967 — E. F. BRUNING — 3,317,220
RELEASABLE FLUID COUPLING
Filed April 15, 1963 — 2 Sheets-Sheet 2
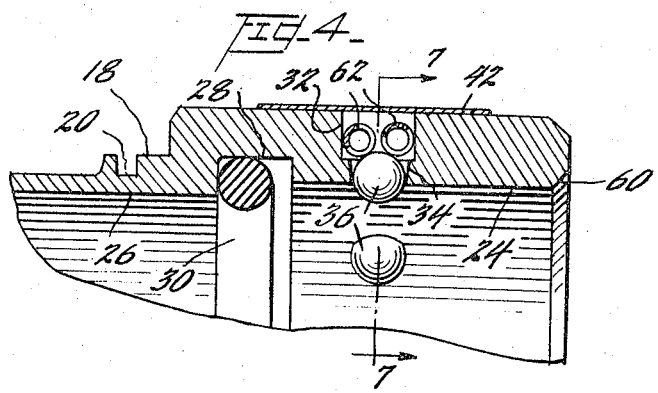
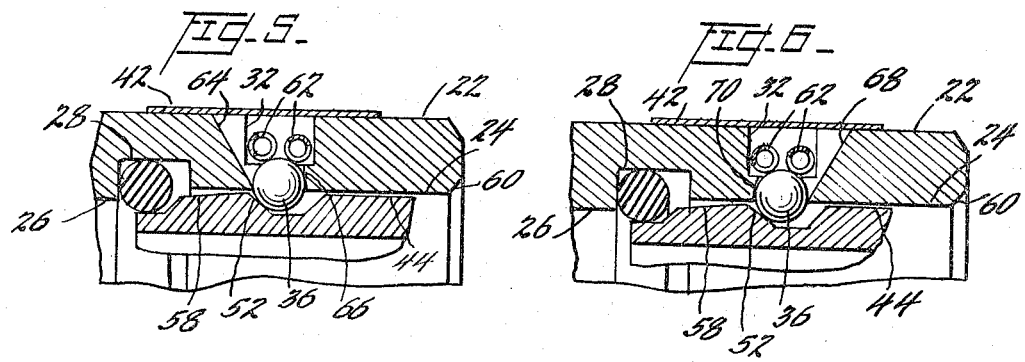
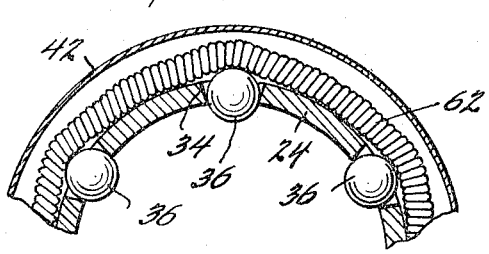
INVENTOR
Earl F. Bruning,
BY Parker and Walsh
ATTORNEYS

United States Patent Office

3,317,220
Patented May 2, 1967

3,317,220
RELEASABLE FLUID COUPLING
Earl F. Bruning, P.O. Box 147,
Lincoln, Nebr. 68501
Filed Apr. 15, 1963, Ser. No. 272,921
2 Claims. (Cl. 285—1)

This invention relates to fluid couplings, and in particular to those of the quick-connect, quick-disconnect type. Although the preferred embodiment employed herein for illustrative purposes is primarily intended for use in conducting gases, such as air or oxygen, in resuscitation work, it is also applicable to systems involving liquid flow, where quick action with positive sealing is requisite.

Basically the invention contemplates a coupling including a female member having radial bores and spring-pressed locking spheres, for cooperation with a male member having an annular channel to receive the spheres in locking relationship, against axial movement. Devices of this general nature have been proposed heretofore, but they have been complex and cumbersome, with an excessive number of distinct parts, and correspondingly expensive, difficult of manufacture, assembly and maintenance, and lacking in reliability as to performance.

It is therefore a principal, and general object of the invention to provide an axial-thrust coupling, with spring-biased spherical detents, which has a minimum of parts, and is therefore less complex than devices of this sort heretofore known.

Another object is to provide a coupling as aforesaid, in which the spring bias is applied on a peripheral line, outwardly of the detents, and a related object is to provide a pair of endless coil springs so arranged in respect to the detents as to provide favorable distribution of forces, in respect to the overall problem of connecting and disconnecting. More particularly, it is an object to provide endless coil, compression springs, in pairs, in surrounding relation to the ball detents.

Yet another object is to provide for differential resistance in the detents, for varying the relative ease of connecting and disconnecting. In still greater particular, it is an object to provide differential resistance in the detents by preferential sloping of the said radial bores, which hold and guide the detents.

These and other objects, which will be apparent, are attained by the present invention, a preferred form of which is described in the following specification, as illustrated in the drawing, in which:

FIGURE 1 is a side elevational view of the coupling components, fully joined, with interior mechanism indicated in broken lines;

FIGURE 2 is a view similar to FIGURE 1, on enlarged scale, shown in cross section for 90° about the axis;

FIGURE 3 is a transverse, cross sectional view, taken on the plane of the line 3—3 of FIGURE 2;

FIGURE 4 is a fragmentary, sectional view of a female component, showing a modified, holding spring for the ball detents;

FIGURES 5 and 6 are views similar to FIGURE 4, showing modified guide bores for the ball detents; and FIGURE 7 is a sectional view, taken on the line 7—7 of FIGURE 4.

Referring to the drawings by characters of reference, there is shown, in FIGURES 1 and 2, a coupling system comprising a female, tubular component 10 and a male, tubular component 12, each comprising a cylindrical portion 14, an outer terminal, peripheral bead 16, and an inner collar, or flange, 18, having an annular channel 20, the beads, collars and channel all cooperating in holding a rubber hose or the like in fluid-sealing relationship, as understood in the art.

Contiguous with the collar 18 of the component 10, the latter has an enlarged, outer sleeve or head, 22, the inner surface 24 of which is of somewhat greater diameter than the main bore 26 of component 10, in order to provide end sealing for the male component, as will be seen.

Near the inner end of the sleeve or head 22, its inner surface 24 is provided with an annular channel, or groove, 28, accommodating an O-ring 30, which cooperates with the male component to provide the fluid seal.

The head 22, which extends an appreciable distance, radially, beyond flange 18, has, medially its longitudinal extent, an annular channel 32, with side walls perpendicular to the axis of the coupling tube. Equidistantly spaced about channel 32 are six bores 34, which are arranged generally radially of tthe tube, and communicate from the channel to the interior of the tube, but which are actually slightly frusto-conical, and are sized to hold detent balls 36, so that they protrude into the inneterior of the tube, but to hold them at a position with slightly less than half the ball extending into the tube. The balls are retained in this inner position by a peripheral, spring keeper, and in the embodiment shown in FIGURES 1–3, the keeper consists of a split ring, or band, 38, of spring material. It will be noted from FIGURE 3, that the keeper spring has radially inturned ends 40 which prevent peripheral movement of the spring to any extent which would uncover any of the balls 36. The parts are further retained against loss by means of a ring-form band 42 arranged in overlying relation to channel 32, and welded, brazed or soldered in place, and also serving to protect the channel against entry of dirt or other foreign matter.

Forwardly of the flange 18, the male component 12 has an exterior surface 44, sized for a smooth, sliding fit in the surface 24 of component 10, and at its forward end, this portion of the male component has an internally extending, thickened, end portion 46, of narrower bore than its main, interior surface 48. Outwardly of the thickened portion 46, the male component is provided with an annular channel 50, for receiving the detent balls 36, and as shown, these channels are trapezoidal in cross section, with outwardly diverging side walls 52, adapted to cam the balls 36 radially outwardly on relative axial movement of the coupling components. For cooperation with the O-ring 30, the male component 12 has a reduced outer end 54, bounded inwardly by a slanting, side wall 56, which has a camming action on the ball detents during joining of the parts. Between wall 56 and channel 50, the outer wall of male component 12 is tapered, as at 58, in order to more readily effect the telescopic insertion, and to this end, the end of the female component is also bevelled, as at 60, on its inner corner. Slant section 58 also results in more gradual lifting of the ball detents upon joining the parts, at a phase of the cycle when spring pressure is greatest.

From the foregoing, the operation will be obvious. In order to effect a coupling, it is only necessary to bring the parts together, during which both slant sections 56 and 58 cooperate with bevelled corner 60 to cause a quick and sure guidance of the parts to coupled position. During this movement, the ball detents 36 are urged radially outwardly, against the pressure of split band 38, and as the outer end of the male component 12 comes into sealing engagement with O-ring 30, the balls 36 are urged radially inwardly by the spring, to a seat in groove 50. Thus locking is effected by the simple, relative, axial movement of the parts, with no moving parts involved other than the detent balls and the spring band.

For withdrawal of the parts, the action is simply reversed. With outward pull on the parts, the balls are cammed outwardly, against the spring pressure, by the innermost of the slant walls 52, and the parts come apart freely, after which the balls are returned to inward position by the spring, in readiness for the next coupling action.

The holding power of the ball detents, or conversely, the readiness with which the parts may be separated, will depend upon the slant of wall 52, which will offer increasing resistance to separation as the angle with the radial direction diminishes. In the event that quick-connection is desired, the walls 56, 58, will be suitably slanted to this end, and wall 52 may, in this case, be arranged for greater resistance to separation. In most cases, however, ready coupling will be desirable, and the wall 52 will be arranged for easy or difficult separation as required by a particular situation.

The modification shown in FIGURES 4 and 7 differs from that in FIGURES 1–3 solely in the retaining spring means, which, in this case, comprises a pair of endless coil springs 62, or garter springs, as they are called. Other than the springs, everything in FIGURES 4 and 7 is the same as in FIGURES 1–3, and the parts are therefore indicated, in each case, by the same reference numerals.

In the modifications shown in FIGURES 5 and 6, the frusto-conical ball seat is tilted so as to coact with the cam surfaces on the male component in determining the degree of ease of coupling, or separation, as the case may be. Thus, if ease of coupling is desired, the form shown in FIGURE 5 may be used. Here, the ball seat in the female component, while retaining its frusto-conical form, to hold the ball captive, is slanted, as a whole, with respect to a plane perpendicular to the tube axis, so that part of it penetrates the sleeve 22 inwardly of the channel 32, as at 64, while the opposite side 66 terminates within the base of channel 32. In this case, it will be seen that upon approach of the parts, the ball 36 readily moves along part 64 of its conical seat, in response to the camming action of slant faces 56 and 58 of the male component. However, upon attempted withdrawal, the side 66 of the seat opposes, rather than assists outward movement of the ball, and as a result, withdrawal is relatively difficult. In this action, the radial lines in the ball to the points of tangency on side 66 and on surface 52 form an obtuse angle, and the limiting value of this angle is 180°, at which value the moving force and the resisting force are directly opposed, one to the other. The situation is exactly the reverse in FIGURE 6, wherein the outer side 68 of the conical seat is slanted in the opposite direction, so that separation of the parts is facilitated, and the other side, 70, of the seat opposes movement of the parts to coupled position. In these modifications, the dual garter spring has an added significance in that that it has separate application to the two distinct patterns of forces involved. This, among other things, affords a further range of design of resistance in the coupling-uncoupling action.

While a certain, preferred embodiment has been shown and described, various modifications will be apparent, in the light of this disclosure, and the invention should not, therefore, be deemed as limted, except insofar as shall appear from the spirit and scope of the appended claims.

I claim:
1. A tubular coupling comprising female and male components, said female component having a radially enlarged outer end portion with an annular channel in its outer surface, said channel having a series of peripherally spaced passages opening into the channel and into the interior of said female component, said passages converging in diameter in an inward direction, the slant of the walls, with respect to a plane perpendicular to the tubular axis, being greater toward the outer end of the female component than toward the inner end of the female component, a sphere in each passage having a diameter intermediate the maximum and minimum diameters of the passage, spring means of circular form arranged in said channel, in surrounding relation to said spheres, collectively, to retain said spheres in said passages, and a male component having a radially inwardly thickened, outer end portion, having an outer, annular channel with at least one slanted side wall, adapted to receive inwardly extending portions of said spheres.

2. A tubular coupling comprising female and male components, said female component having a radially enlarged outer end portion with an annular channel in its outer surface, said channel having a series of peripherally spaced passages opening into the channel and into the interior of said female component, said passages converging in diameter in an inward direction, the slant of the walls, with respect to a plane perpendicular to the tubular axis, being greater toward the inner end of the female component than toward the outer end of the female component, a sphere in each passage having a diameter intermediate the maximum and minimum diameters of the passage, spring means of circular form aranged in said channel, in surrounding relation to said spheres, collectively, to retain said spheres in said passages, and a male component having inwardly thickened, outer end portion, having an outer, annular channel with at least one slanted side wall, adapted to receive inwardly extending portions of said spheres.

References Cited by the Examiner
UNITED STATES PATENTS

| | | | |
|---|---|---|---|
| 1,593,791 | 7/1926 | Butler | 285—102 |
| 2,069,377 | 2/1937 | Matthiessen | 285—315 X |
| 2,452,430 | 10/1948 | Clark et al. | 285—304 |
| 2,473,973 | 6/1949 | Scheiwer | 285—313 X |
| 2,536,702 | 1/1951 | Scheiwer | 285—1 X |
| 2,560,263 | 7/1951 | Wiegand et al. | 285—281 X |
| 2,642,297 | 6/1953 | Hanna | 285—304 |
| 2,666,656 | 1/1954 | Bruning | 285—1 X |
| 2,674,469 | 4/1954 | Earle | 285—1 X |
| 2,699,961 | 1/1955 | Omon et al. | 285—1 X |
| 2,860,893 | 11/1958 | Clark | 285—1 |

CARL W. TOMLIN, *Primary Examiner.*

THOMAS F. CALLAGHAN, EDWARD C. ALLEN,
*Examiners.*

R. SCOTT, *Assistant Examiner.*